(12) United States Patent
Sakuragi et al.

(10) Patent No.: US 6,467,963 B2
(45) Date of Patent: Oct. 22, 2002

(54) FLUID BEARING EQUIPMENT

(75) Inventors: Katsunori Sakuragi, Yonago (JP); Takao Yoshitsugu, Yonago (JP); Yasuo Saeki, Tottori-ken (JP); Hideshi Fukutani, Yonago (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/244,038

(22) Filed: Feb. 4, 1999

(65) Prior Publication Data
US 2001/0014188 A1 Aug. 16, 2001

(30) Foreign Application Priority Data

Feb. 9, 1998 (JP) ............................................. 10-026274

(51) Int. Cl.[7] ............................. H02K 5/16; G11B 5/52; F16C 32/06
(52) U.S. Cl. ........................ 384/107; 384/112; 384/123
(58) Field of Search ................................ 384/100, 107, 384/112, 121, 123; 310/90, 156

(56) References Cited

U.S. PATENT DOCUMENTS

| | | | | |
|---|---|---|---|---|
| 3,870,382 A | * | 3/1975 | Reinhoudt | ................... 384/123 |
| 5,357,163 A | * | 10/1994 | Minakuchi et al. | ............ 310/90 |
| 5,457,588 A | * | 10/1995 | Hattori et al. | ............ 360/99.08 |
| 5,487,608 A | * | 1/1996 | Leuthold et al. | ............. 384/123 |
| 5,504,637 A | * | 4/1996 | Asada et al. | ................ 384/107 |
| 5,678,929 A | * | 10/1997 | Parsoneault et al. | ......... 384/107 |
| 6,017,150 A | * | 1/2000 | Lee | ............................... 384/123 |

FOREIGN PATENT DOCUMENTS

| JP | 56-16935 | 2/1981 |
|---|---|---|
| JP | 56-20828 | 2/1981 |

* cited by examiner

*Primary Examiner*—William C Joyce
(74) *Attorney, Agent, or Firm*—Parkhurst & Wendel, L.L.P.

(57) ABSTRACT

Fluid bearing equipment which is free from lockup or seizure which may occur due to a deficiency of a lubricating fluid when the equipment is operated at a high rotation speed in a high temperature environment. The fluid bearing equipment is arranged such that maximum pressure generating portions 23 of dynamic pressure generating grooves 15, 16 provided in a thrust-side dynamic pressure generating portion are located closer to the outer circumference of a stationary thrust plate 9 than a radially middle position of the thrust-side dynamic pressure generating portion. With this arrangement, the lockup and seizure of a motor can be prevented which may otherwise occur due to a deficiency of the lubricating fluid when the equipment is operated at a high rotation speed in a high temperature environment.

3 Claims, 8 Drawing Sheets

FLUID BEARING EQUIPMENT

FIELD OF THE INVENTION

The present invention relates to a fluid bearing equipment for use in an office automation system and an audiovisual system.

BACKGROUND OF THE INVENTION

Fluid bearing equipments are generally used in rotary head cylinders for tabletop VTRs and camera-incorporated VTRs, in polygon scanner motors for laser copiers, and in recording medium rotation drivers for floppy disk devices and hard disk devices.

Specifically, the hard disk devices have higher memory capacities and higher data transfer speeds. This requires a disk rotating device for use in a recording apparatus of this type to be capable of high-speed and high-precision rotation.

To this end, a fluid bearing equipment as disclosed in U.S. Pat. No. 5,504,637 is used for a rotary main shaft of the recording apparatus.

Figure 6:
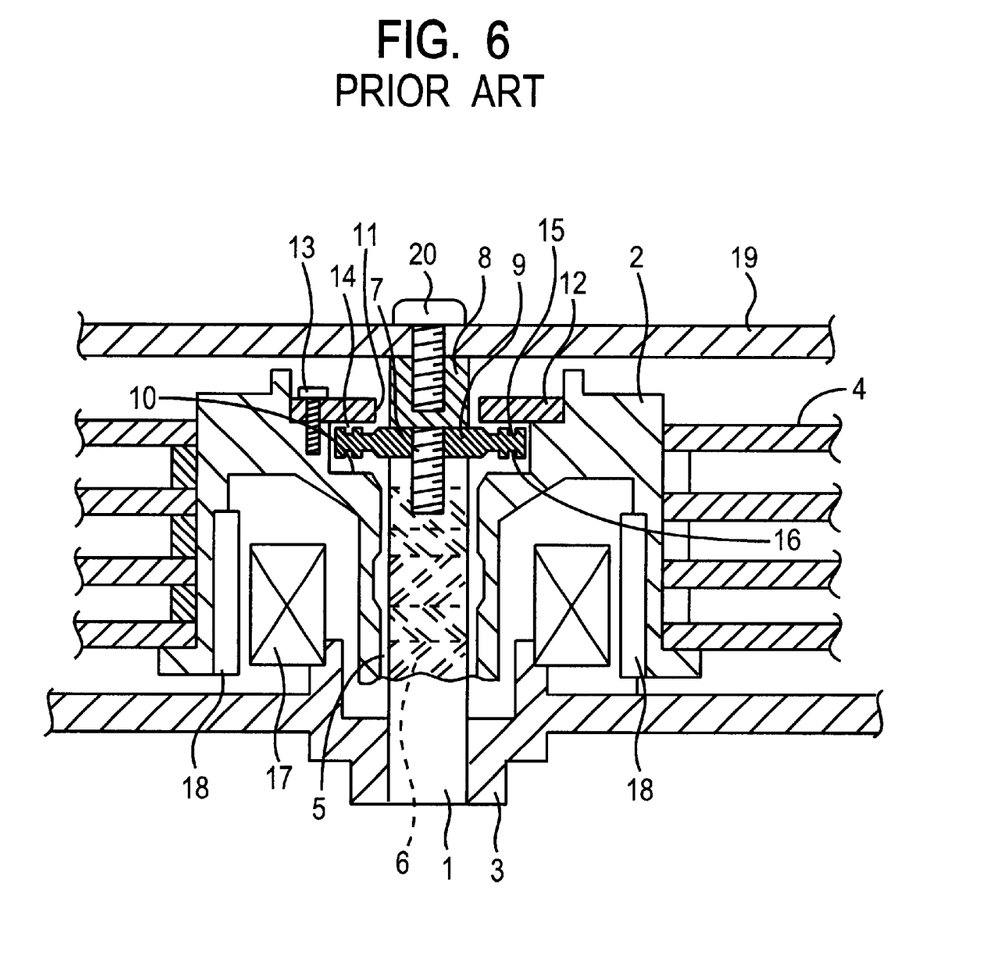
FIG. 6 is a sectional view of a conventional fluid bearing equipment.
Figure 7:
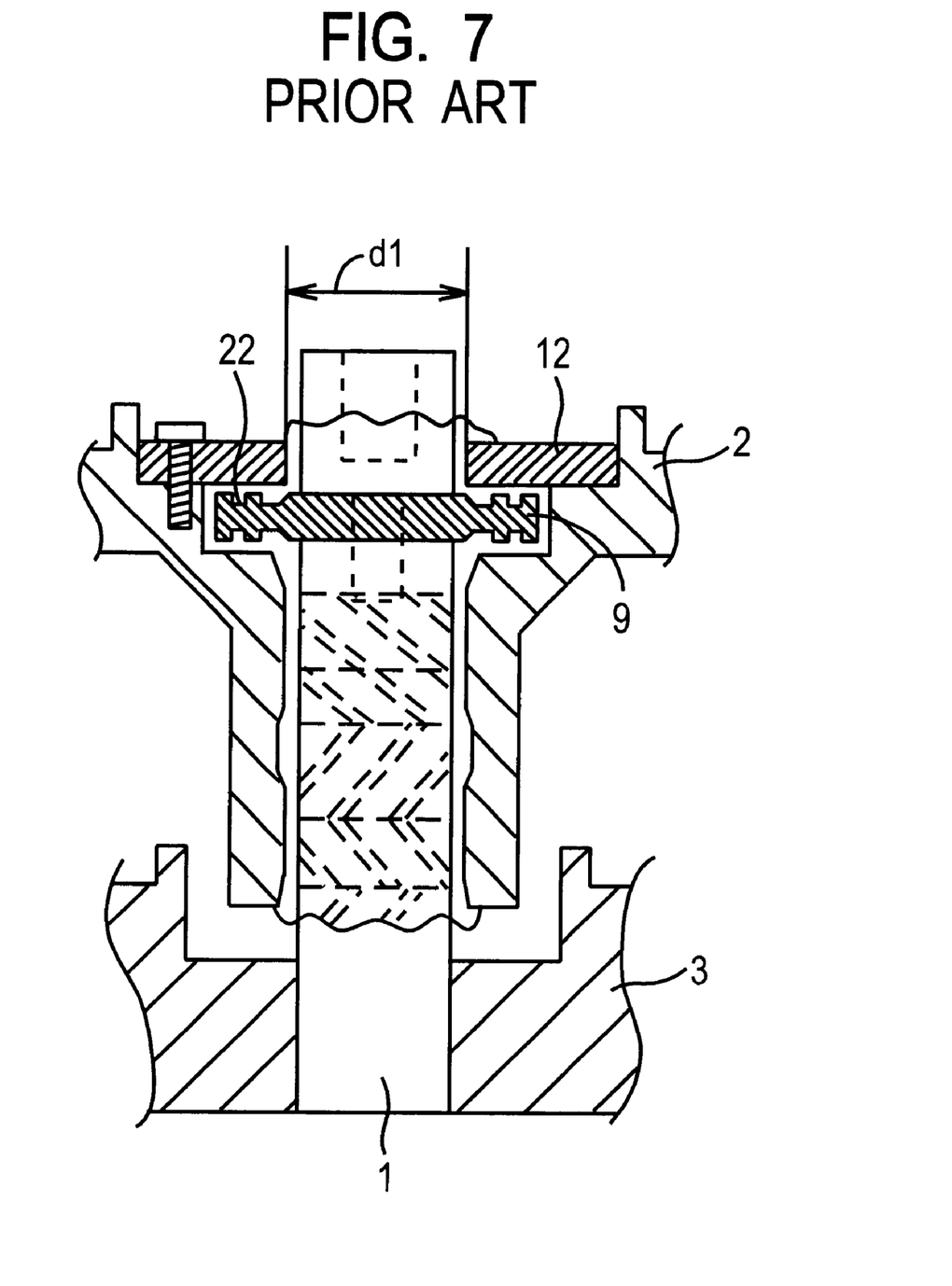
FIG. 7 is an enlarged view illustrating major portions of the fluid bearing equipment of FIG. 6.

The fluid bearing equipment has a construction as shown in FIGS. 6 and 7.

The fluid bearing equipment includes a stationary shaft 1 and a rotary sleeve 2 supported around the stationary shaft 1. The stationary shaft 1 has a proximal end fixed to a lower casing 3. Hard disks 4 are fitted around the rotary sleeve 2.

Dynamic pressure generating grooves 6 are provided in an outer circumferential portion of the stationary shaft 1 in a radial-side dynamic pressure generating portion 5 defined between the stationary shaft 1 and the rotary sleeve 2.

A stationary thrust plate 9 is attached to a distal end of the stationary shaft 1 by an extension shaft 8 formed with a male thread portion 7 threaded with the stationary shaft 1.

The rotary sleeve 2 has a recessed portion 10 provided in association with the stationary thrust plate 9. An opening of the recessed portion 10 is virtually closed by a rotary thrust plate 12 which has at its center a center hole 11 of a diameter greater than the outer diameter of the extension shaft 8. The rotary thrust plate 12 is fixed to the rotary sleeve 2 by a screw 13.

In a thrust-side dynamic pressure generating portion 14 defined by the recessed portion 10 of the rotary sleeve 2, the stationary thrust plate 9 and the rotary thrust plate 12, dynamic pressure generating grooves 15, 16 are provided in upper and lower faces of the stationary thrust plate 9. The thrust-side dynamic pressure generating portion 14 and the radial-side dynamic pressure generating portion 5 are filled with a lubricating fluid.

A stator winding 17 is disposed around a proximal end portion of the stationary shaft 1 on the lower casing 3. A magnet 18 is provided on an inner circumferential surface of the rotary sleeve 2 as opposing to the stator winding 17. The extension shaft 8 is fixed to an upper casing 19 by a screw 20.

In the fluid bearing equipment having the aforesaid construction, the hard disks 4 are rotated at a high speed via the rotary sleeve 2 in a sealed space defined between the lower casing 3 and the upper casing 19 upon energization of the stator winding 17.

The rotation of the rotary sleeve 2 about the stationary shaft 1 pumps the lubricating fluid so that the rotary sleeve 2 can maintain non-contact rotation.

Figure 8:
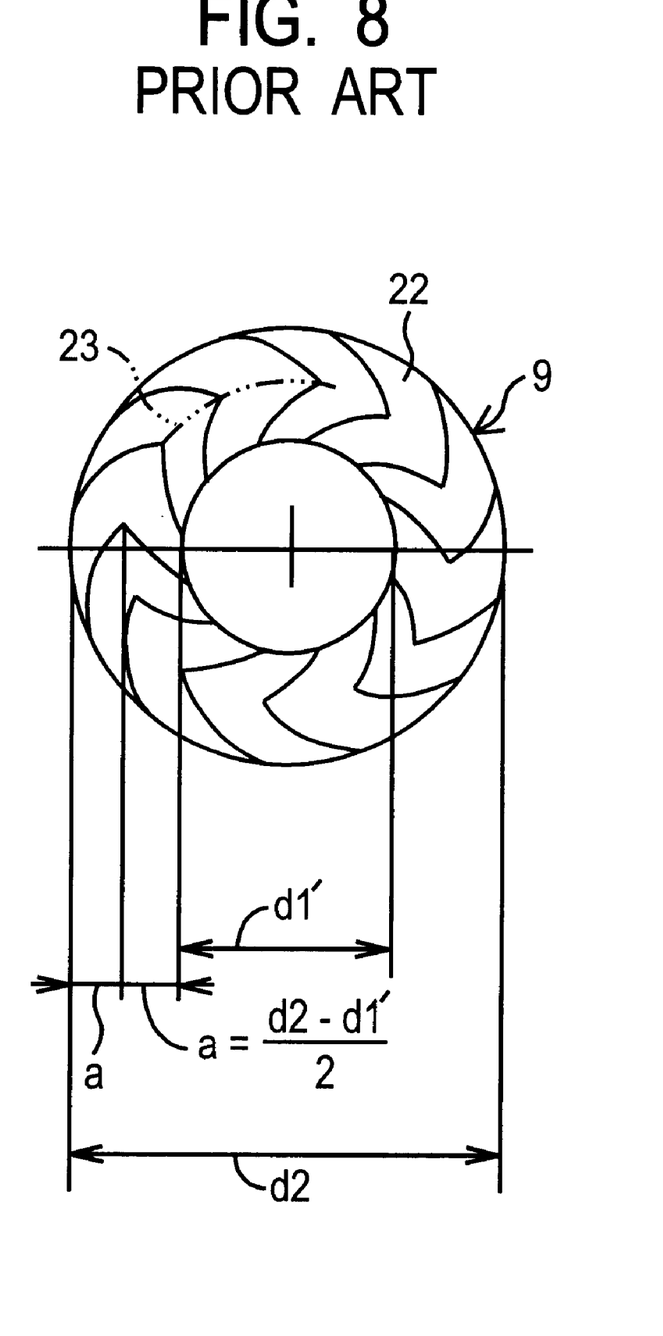
FIG. 8 is a plan view illustrating herringbone grooves provided in a common stationary thrust plate.

The dynamic pressure generating grooves 15, 16 in the thrust-side dynamic pressure generating portion 14, though no specific explanation is given thereto in U.S. Pat. 5,504,637, generally have an arrangement as disclosed in Japanese Examined Patent Publication No. 59-45844 (1984). More specifically, the dynamic pressure generating grooves are provided as herringbone grooves 22 arranged circumferentially of the stationary thrust plate 9 as shown in FIG. 8. A line 23 linking apices of the herringbone grooves is located in a radially middle position of the thrust-side dynamic pressure generating portion. The dimensions of the prior art thrust plate satisfy the equation: a=(d2−d1') (0.5), wherein "d2" is the outer diameter of the plate, "d1'" is the inner diameter, and "a" is the distance from either its outer, or inner edge to the apices of the herring bone portion.

DISCLOSURE OF THE INVENTION

However, the aforesaid arrangement has the following drawback.

The fluid bearing equipment of this type, which is adapted for high speed rotation and has an open portion on the upper side of the thrust-side dynamic pressure generating portion, suffers from a unique demerit such that the lubricating fluid is liable to leak out of the thrust-side dynamic pressure generating portion due to various causes such as thermal expansion of the lubricating fluid or bubbles (air) in the lubricating fluid which may occur when the temperature of the lubricating fluid rises during use or when the equipment is used in a high temperature environment, and a variation in the amount of the lubricating fluid charged into the equipment by a dispenser (i.e., an excess of the charged lubricating fluid).

It is therefore an object of the present invention to provide a fluid bearing equipment which is free from lockup or seizure of a bearing which may occur due to a deficiency of a lubricating fluid when the equipment is operated at a high rotation speed in a high temperature environment.

The fluid bearing equipment of the present invention is characterized in that a maximum pressure generating portion of a dynamic pressure generating groove provided in a thrust-side dynamic pressure generating portion is located closer to the outer circumference of a stationary thrust plate than a radially middle position of the thrust-side dynamic pressure generating portion.

With the aforesaid arrangement according to the present invention, lockup and seizure of a motor can be prevented which may otherwise occur due to a deficiency of the lubricating fluid when the equipment is operated at a high rotation speed in a high temperature environment.

In accordance with one particular embodiment of the present invention, there is provided a fluid bearing equipment which comprises a stationary shaft having at least one fixed end and a rotary sleeve supported rotatably about the stationary shaft and is adapted to pump a lubricating fluid between the stationary shaft and the rotary sleeve for non-contact rotation of the equipment, wherein the stationary shaft is provided with a stationary thrust plate, wherein the rotary sleeve has a recessed portion defined by faces thereof opposed to upper and lower faces and outer circumferential surface of the stationary thrust plate, wherein a dynamic pressure generating groove is provided in a radial-side dynamic pressure generating portion defined by an outer circumferential portion of the stationary shaft and an inner circumferential portion of a center hole formed in the rotary sleeve, wherein dynamic pressure generating grooves are provided in a thrust-side dynamic pressure generating portion defined by the stationary thrust plate, the inner circumferential surface of the recessed portion of the rotary sleeve and the faces of the rotary sleeve opposed to the stationary thrust plate, wherein the radial-side dynamic pressure generating portion and the thrust-side dynamic pressure generating portion are filled with the lubricating fluid, wherein a maximum pressure generating portion of the dynamic pressure generating groove provided in the thrust-side dynamic pressure generating portion is located closer to the outer circumference of the stationary thrust plate than a radially middle position of the thrust-side dynamic pressure generating portion. In In accordance with an aspect of the present invention, the fluid bearing equipment according one embodiment is characterized in that the following expression is satisfied:

$$d2^2-d3^2 \text{ approximately equals } d3^2-d1^2$$

wherein d1 is an effective inner diameter of a rotary-thrust-side portion of the thrust-side dynamic pressure generating portion, d2 is an outer diameter of the stationary thrust plate, and d3 is a diameter of the maximum pressure generating portion of the dynamic pressure generating groove provided in the thrust-side dynamic pressure generating portion.

In accordance with another aspect of the present invention, the fluid bearing equipment according to this same embodiment is characterized in that the dynamic pressure generating groove in the thrust-side dynamic pressure generating portion is comprised of herringbone grooves circumferentially arranged, and a line linking apices of the herringbone grooves is located closer to the outer circumference of the stationary thrust plate than the radially middle position of the thrust-side dynamic pressure generating portion.

In accordance with yet another aspect of the present invention, the fluid bearing equipment according to the previously discussed embodiment comprises: a stationary shaft having a proximal end fixed to a casing; a rotary sleeve supported rotatably about the stationary shaft and having an open portion provided adjacent one end thereof in association with a distal end of the stationary shaft, the open portion having a diameter greater than a diameter of the stationary shaft, the rotary sleeve having an outer circumference to which a load member is attached; a stationary thrust plate of a disk shape having a through-hole at its center and attached to the distal end of the stationary shaft, the stationary thrust plate having a lower face opposed to a bottom of the open portion of the rotary sleeve and an outer circumferential surface opposed to an inner circumferential surface of the open portion; an extension shaft having a proximal end threaded with the distal end of the stationary shaft thereby fixing the stationary thrust plate to the stationary shaft; and a rotary thrust plate of a disk shape fitted in the open portion of the rotary sleeve and having at its center a through-hole through which the extension shaft extends, wherein a dynamic pressure generating groove is provided in a radial-side dynamic pressure generating portion defined by an outer circumferential portion of the stationary shaft and an inner circumferential portion of a center hole formed in the rotary sleeve, wherein a dynamic pressure generating groove is provided in a thrust-side dynamic pressure generating portion defined by the stationary thrust plate, the inner circumferential surface of the open portion of the rotary sleeve and faces of the rotary sleeve opposed to the stationary thrust plate, wherein the radial-side dynamic pressure generating portion and the thrust-side dynamic pressure generating portion are filled with a lubricating fluid, wherein the following expression is satisfied:

$$d2(d4-d2)>d1\{(d3-d1)-(d2-d3)\}$$

wherein d1 is an effective inner diameter of a rotary-thrust-side portion of the thrust-side dynamic pressure generating portion, d2 is an outer diameter of the stationary thrust plate, d3 is a diameter of a maximum pressure generating portion of the dynamic pressure generating groove provided in the thrust-side dynamic pressure generating portion and d4 is an inner diameter of the open portion of the rotary sleeve.

DESCRIPTION OF THE EMBODIMENT

An embodiment of the present invention will hereinafter be described with reference to FIGS. 1 to 5.

Figure 1:
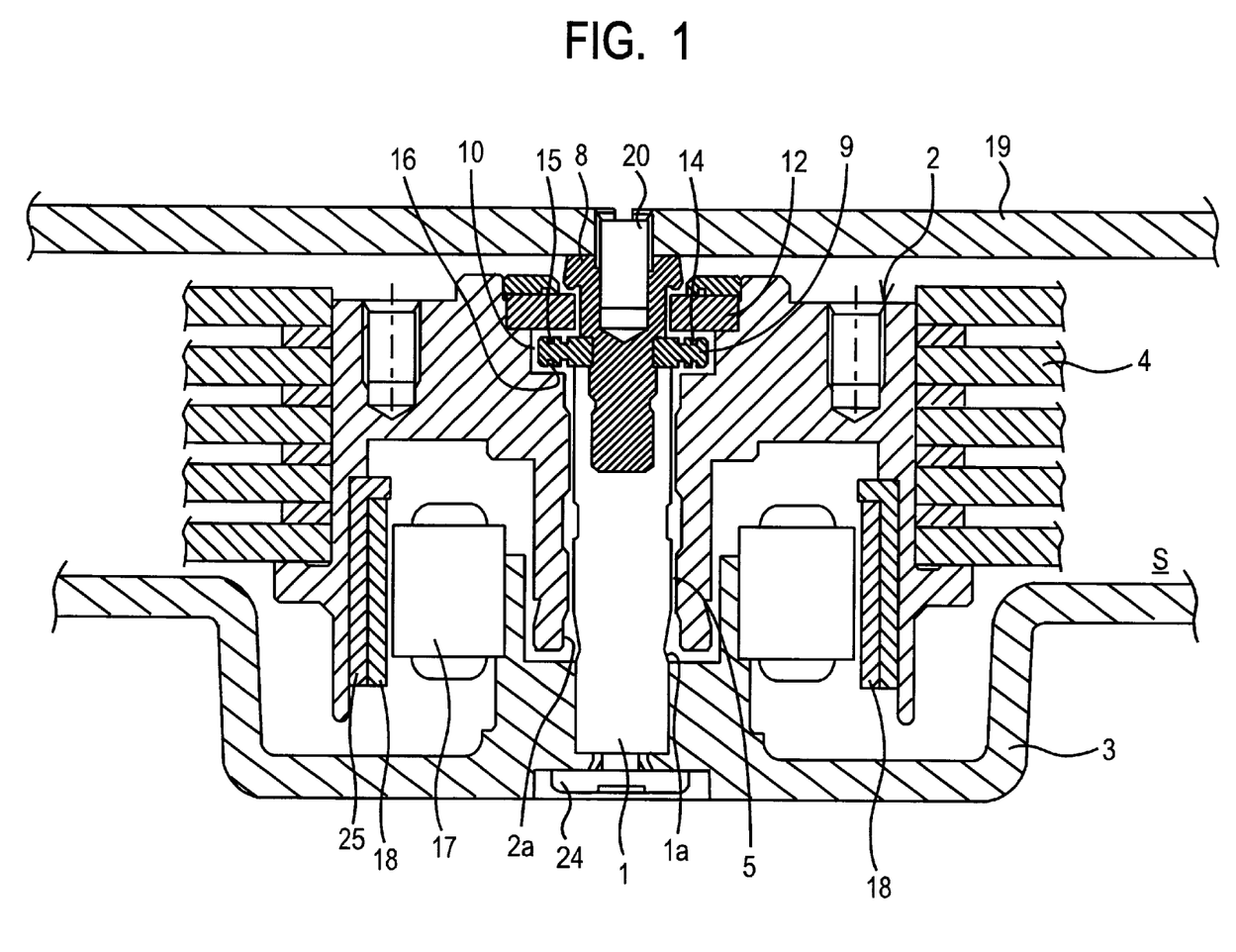
FIG. 1 is a sectional view illustrating a fluid bearing equipment according to one embodiment of the present invention.

FIG. 1 shows a fluid bearing equipment for use in a hard disk device.

This fluid bearing equipment is illustrated as having a construction such that a stationary shaft is supported at its opposite ends, but the stationary shaft may be cantilevered.

The fluid bearing equipment shown in FIG. 1 has substantially the same construction as the conventional one shown in FIGS. 6 and 7 with some specific portions thereof being different. In these figures, components having like functions are denoted by like reference characters.

Referring to FIG. 1, a proximal end of the stationary shaft 1 is fixed to a lower casing 3 by a screw 24. A stationary thrust plate 9 is fixed to a distal end of the stationary shaft 1 by an extension shaft 8 and fitted in a rotary sleeve 2.

The rotary sleeve 2 has a recessed portion 10 which is defined by faces thereof opposed to lower and upper faces and outer circumferential surface of the stationary thrust plate 9. A radial-side dynamic pressure generating portion 5 is defined between the stationary shaft 1 and the rotary sleeve 2, and a thrust-side dynamic pressure generating portion 14 is defined between the stationary thrust plate 9 and the recessed portion 10 and provided on one side of the radial-side dynamic pressure generating portion 5. Dynamic pressure generating grooves 6 are provided on an outer circumferential portion of the stationary shaft 1 in the radial-side dynamic pressure generating portion 5. Dynamic pressure generating grooves 15 and 16 are provided in upper and lower faces, respectively, of the stationary thrust plate 9 in the thrust-side dynamic pressure generating portion 14.

Figure 2:
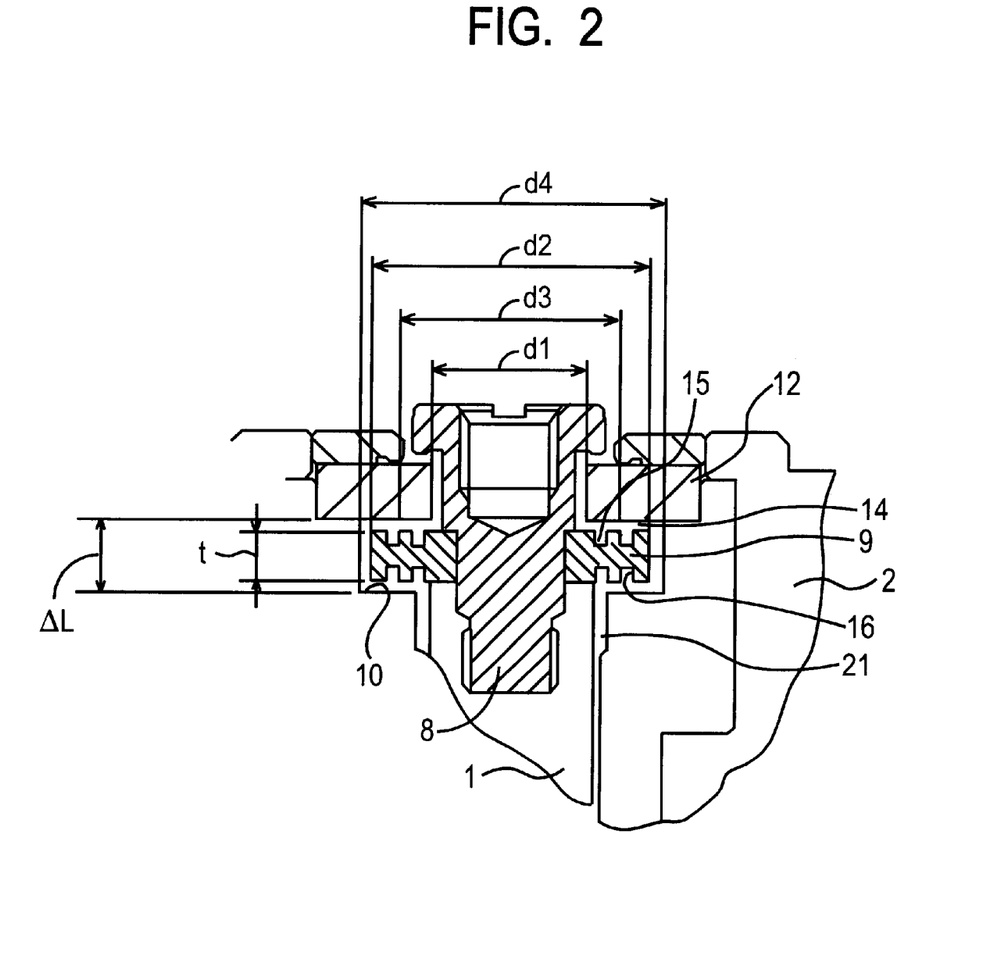
FIG. 2 is an enlarged view illustrating major portions of the fluid bearing equipment of the embodiment.
Figure 3:
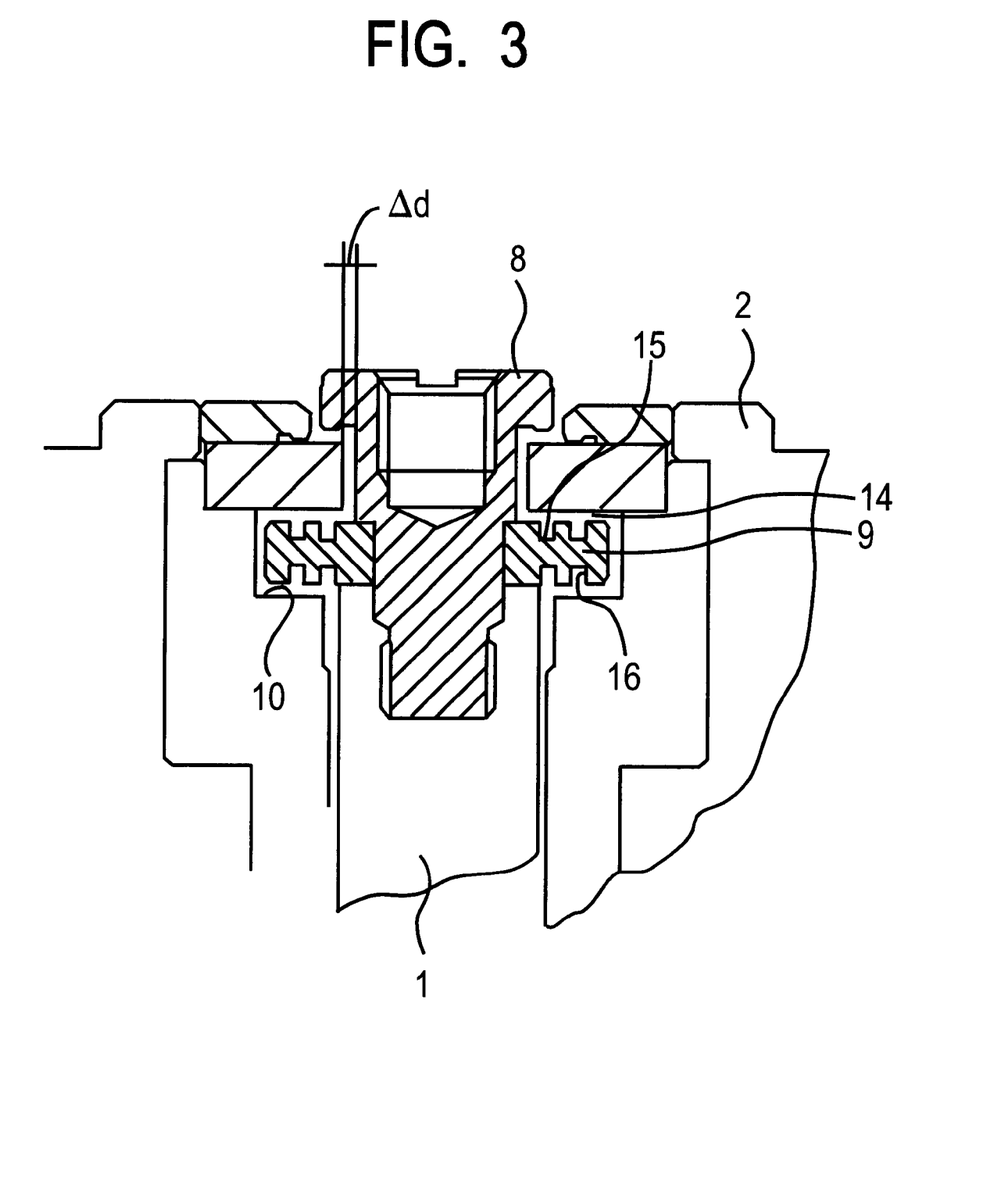
FIG. 3 is an enlarged view illustrating major portions of the fluid bearing equipment of the embodiment.

Provided that the stationary thrust plate 9 has a thickness t and the recessed portion 10 has a height ΔL as shown in FIG. 2, a radial spacing Δd of a gap at an open end of the thrust-side dynamic pressure generating portion 14 (see FIG. 3) is set as satisfying the following expression:

$$\Delta d > \Delta L - t$$

A lubricating fluid 21 is filled in the radial-side dynamic pressure generating portion 5 and the thrust-side dynamic pressure generating portion 14. The lubricating fluid to be herein used is composed of not less than 95% of an ester oil with the remaining not greater than 5% being a mineral oil, an olefin, a hydrocarbon or the like. The surface tension of the lubricating fluid is adjusted to 25 dyn/cm (at 29° C.).

In a gap between the rotary sleeve 2 and the stationary shaft 1 on the lower side of the radial-side dynamic pressure generating portion 5 in FIG. 1, the stationary shaft 1 has a tapered portion 1a having a diameter progressively decreasing toward the proximal end thereof, and a portion of the rotary sleeve 2 formed in association with the tapered portion 1a of the stationary shaft 1 has a larger inner diameter than the inner diameter of a portion of the rotary sleeve 2 facing to the radial-side dynamic pressure generating portion 5. Thus, the lubricating fluid is not allowed into a space defined between the tapered portion la of the stationary shaft 1 and the larger inner diameter portion of the rotary sleeve 2 due to the surface tension of the lubricating fluid.

The rotary sleeve 2 is composed of a copper alloy or an aluminum alloy, and a magnetic steel plate 25 is interposed between the rotary sleeve 2 and a magnet 18 for suppression of magnetic leakage.

With this arrangement, upon energization of a stator winding 17, hard disks 4 are rotated at a high speed via the rotary sleeve 2 in a sealed environment S defined between the lower casing 3 and an upper casing 19. The rotary sleeve 2 is rotated about the stationary shaft 1, whereby the lubricating fluid is pumped to cause the rotary sleeve 2 to maintain non-contact rotation.

It was confirmed that, where a spacing between an upper face of the stationary thrust plate 9 and a lower face of a rotary thrust plate 12 in the thrust-side dynamic pressure generating portion 14 during rotation is 5 μm and a spacing between a lower face of the stationary thrust plate 9 and a face of the rotary sleeve 2 opposed thereto is 10 μm, the optimum performance is ensured. This is expressed as follows:

$$\Delta L = t + 15 \ \mu m$$

For improvement of shock resistance with respect to the thrust direction, it may be preferred that the spacing be smaller. However, it was found that the spacing has a lower limit as expressed by the following expression in consideration of reliability of practical finishing accuracy.

$$\Delta L = t + 10 \ \mu m$$

Further, the spacing has an upper limit as expressed by the following expression in consideration of an allowable range for an intended 500 G shock resistance.

$$\Delta L = t + 30 \ \mu m$$

Therefore, the allowable range of the spacing is expressed as follows:

$$\Delta L = t + 10 \ \mu m \text{ to } 30 \ \mu m$$

Figure 4:
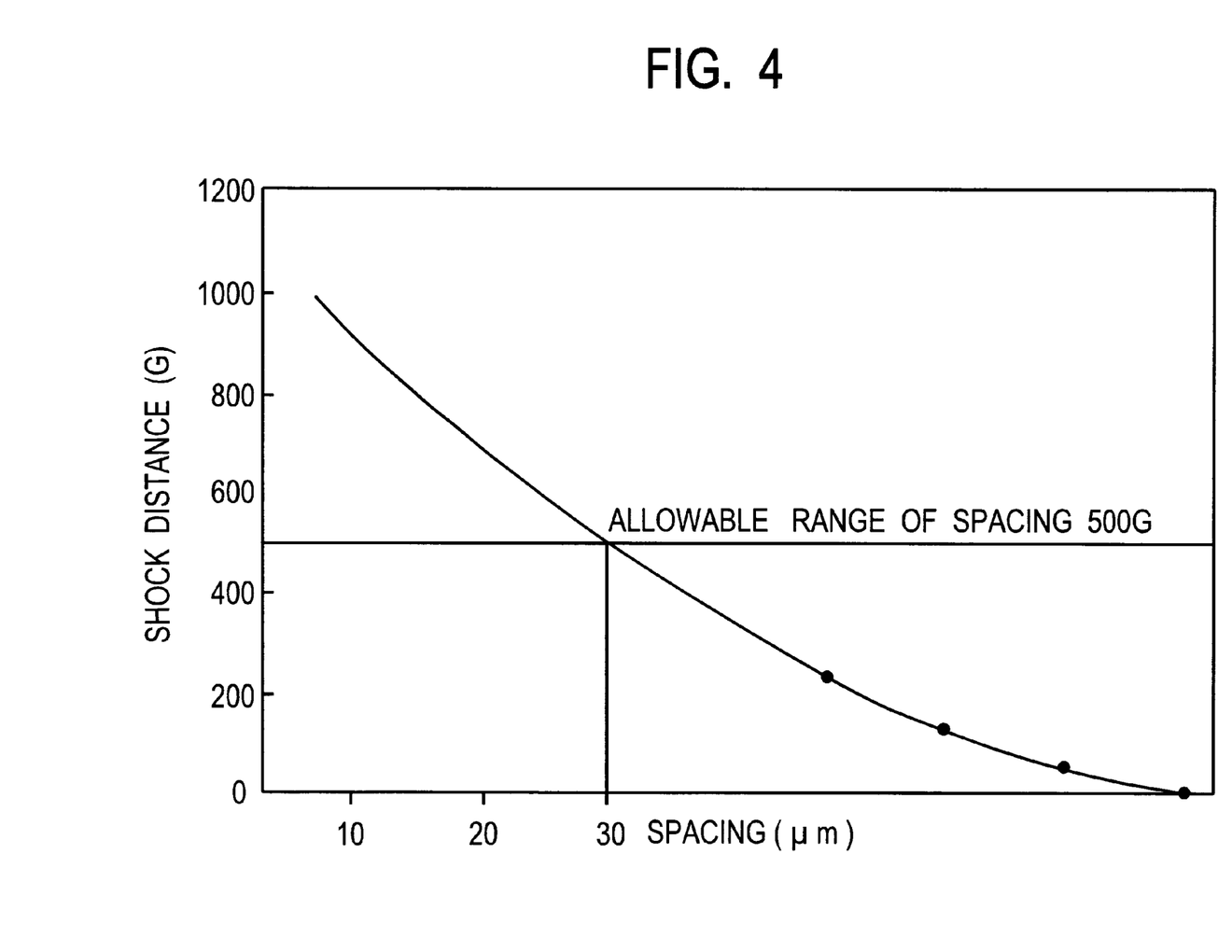
FIG. 4 is a graph showing a relation of a thrust spacing of a gap versus a shock resistance according to the embodiment.

FIG. 4 shows measurement results which indicate the relationship of the spacing versus the shock resistance.

When the intended shock resistance level is lowered in a practically acceptable range without an increase in the finishing accuracy, the allowable range of the spacing is expressed as follows:

$$\Delta L = t + 20 \ \mu m \text{ to } 40 \ \mu m$$

Scattering of the lubricating fluid from the open end of the thrust-side dynamic pressure generating portion to the outside was checked during the operation with the spacing between the upper face of the stationary thrust plate 9 and the lower face of the rotary thrust plate 12 being set to 5 μm, with the expression $\Delta L = t + 15 \ \mu m$ being satisfied, and with the radial spacing Δd of the gap at the open end being set to 15 μm which prevents the lubricating fluid from flowing into the gap by the surface tension of the lubricating fluid herein used, as shown in FIG. 3. As a result, no fluid scattering was observed. It was found that the allowable range of the radial spacing Δd is as follows:

$$\Delta d > \Delta L - t$$

Figure 5A:
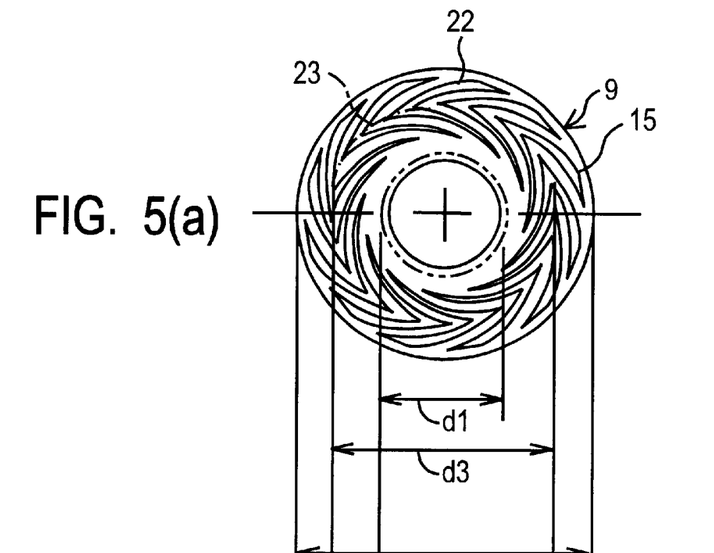
FIGS. 5(a) to 5(c) are plan views and sectional view illustrating herringbone grooves provided in a stationary thrust plate according to the embodiment.
Figure 5B:
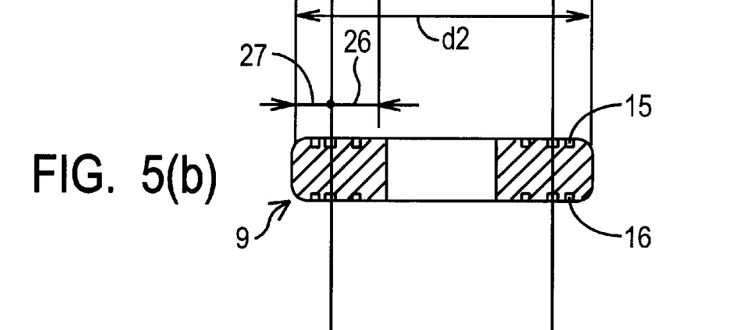
Figure 5C:
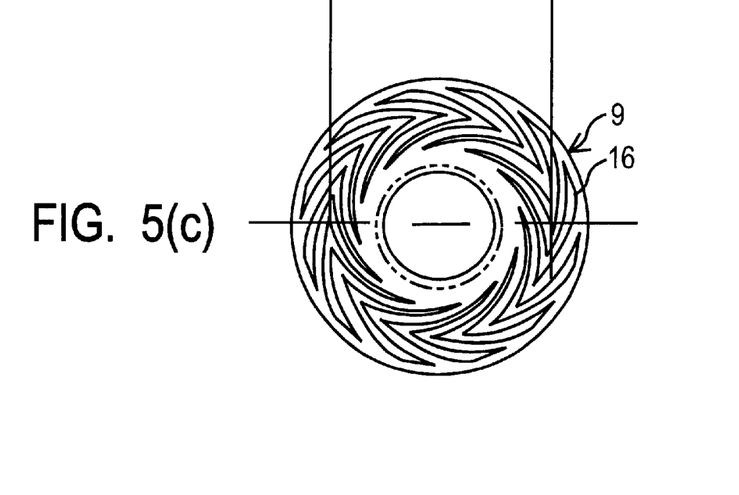

The dynamic pressure generating groove 15 provided in the upper face of the stationary thrust plate 9 in the thrust-side dynamic pressure generating portion 14 is comprised of herringbone grooves 22 circumferentially arranged as shown in FIG. 5, and a line 23 linking apices of the herringbone grooves 22 is located closer to the outer circumference of the stationary thrust plate 9 than the radially middle position of the thrust-side dynamic pressure generating portion.

The line 23 linking the apices of the herringbone grooves 22 corresponds to a maximum pressure generation portion of the thrust-side dynamic pressure generating portion. During the operation, surface tensions on inner and outer circumferential sides 26, 27 of the line 23 in the thrust-side dynamic pressure generating portion 14 are equalized to each other, and the lubricating fluid is evenly supplied to the inner and outer circumferential sides. Therefore, the lubricating fluid does not flow from the inner circumferential side 26 to the outer circumferential side 27, thereby obviating reduction in the levitation level of the rotary sleeve 2. Thus, the lockup and seizure of the motor can be prevented which may otherwise occur due to a deficiency of the lubricating fluid when the equipment is operated at a high rotation speed in a high temperature environment.

The position of the line 23 is expressed as follows.

As shown in FIGS. 2 and 3, an effective inner diameter d1 of a rotary-thrust-side portion of the thrust-side dynamic pressure generating portion corresponds to the inner diameter of the rotary thrust plate 12 when the dynamic pressure generating groove 15 formed in the upper face of the stationary thrust plate 9 is taken into consideration. The line 23 can properly be located by substantially equalizing areas on the inner and outer circumferential sides, i.e., by satisfying the following expression:

$$d2^2 - d3^2 \text{ approximately equal } d3^2 - d1^2$$

wherein d2 is the outer diameter of the stationary thrust plate 9 and d3 is the diameter of the maximum pressure generating portion of the dynamic pressure generating groove provided in the thrust-side dynamic pressure generating portion.

Further, where the following expression is satisfied:

$$d2(d4 - d2) > d1\{(d3 - d1) - (d2 - d3)\}$$

wherein d4 is the inner diameter of the recessed portion 10 of the rotary sleeve 2, a bubble which may develop in the thrust-side dynamic pressure generating portion during a prolonged operation is trapped in a zone on the outer circumferential surface of the stationary thrust plate 9 due to pressure balance, and the bubble zone has a width as expressed by the following expression:

$$(d1/d2)*\{(d3-d1)-(d2-d3)\}$$

Where the width of a clearance between the stationary thrust plate 9 and the rotary sleeve 2 in the recessed potion 10 is greater than the width of the bubble zone, the lubricating fluid can be supplied from the outer periphery of the stationary thrust plate 9, thereby allowing the fluid bearing equipment to have an extended service life.

In the aforesaid embodiment, specific values for the respective parameters were:

d1=2.70 mm
d2=6.50 mm
d3=4.98 mm
d4=6.90 mm

Although only the dynamic pressure generating groove 15 provided in the upper face of the stationary thrust plate 9 has thus been explained in the aforesaid embodiment, the dynamic pressure generating groove 16 provided in the lower face of the stationary thrust plate 9 is arranged in the same manner. Where the dynamic pressure generating grooves 15, 16 are formed by press working, these grooves 15, 16 preferably have the same diameter of the maximum pressure generating portion, d3, for convenience in working the stationary thrust plate 9.

In the aforesaid embodiment, the dynamic pressure generating grooves 15, 16 are each comprised of herringbone grooves, but the configuration of the grooves 15, 16 is not limited thereto. The grooves 15, 16 may have any other configurations. Accordingly, the technical aspect of the present invention is herein defined on the basis of the position of the maximum pressure generating portion of the dynamic pressure generating groove provided in the thrust-side dynamic pressure generating portion.

As described above, the fluid bearing equipment of the present invention is arranged such that the maximum pressure generating portion of the dynamic pressure generating groove provided in the thrust-side dynamic pressure generating portion is located closer to the outer circumference of the stationary thrust plate than the radially middle position of the thrust-side dynamic pressure generating portion. Accordingly, the equipment is free from reduction in the levitation level in the thrust direction, and the lockup and seizure can be prevented which may otherwise occur due to a deficiency of the lubricating fluid when the equipment is operated at a high rotation speed in a high temperature environment. Thus, the fluid bearing equipment is highly reliable and is capable of stably operating for an extended period. Therefore, the fluid bearing equipment is particularly suitable for use in a hard disk device.

What is claimed is:

1. A fluid bearing device comprising:

a stationary shaft having a proximal end fixed to a casing;

a rotary sleeve supported rotatably about the stationary shaft and having an open portion provided adjacent one end thereof in association with a distal end of the stationary shaft, the open portion having a diameter greater than a diameter of the stationary shaft, the rotary sleeve having an outer circumference to which a load member is attached;

a stationary thrust plate of a disk shape having a through-hole at its center and attached to the distal end of the stationary shaft, the stationary thrust plate having a lower face opposed to a bottom of the open portion of the rotary sleeve and an outer circumferential surface opposed to an inner circumferential surface of the open portion;

an extension shaft having a proximal end threaded with the distal end of the stationary shaft thereby fixing the stationary thrust plate to the stationary shaft; and a rotary thrust plate of a disk shape fitted in the open portion of the rotary sleeve and having at its center a through-hole through which the extension shaft extends, wherein a dynamic pressure generating groove is provided in a radial-side dynamic pressure generating portion defined by an outer circumferential portion of the stationary shaft and an inner circumferential portion of a center hole formed in the rotary sleeve, wherein a dynamic pressure generating groove is provided in a thrust-side dynamic pressure generating portion defined by the stationary thrust plate, the inner circumferential surface of the open portion of the rotary sleeve and faces of the rotary sleeve opposed to the stationary thrust plate, wherein the radial-side dynamic pressure generating portion and the thrust-side dynamic pressure generating portion are filled with a lubricating fluid, wherein the following expression is satisfied:

$$d2(d4-d2)>d1\{(d3-d1)-(d2-d3)\}$$

wherein d1 is an diameter of a rotary-thrust-side portion of the thrust-side dynamic pressure generating portion, d2 is an outer diameter of the stationary thrust plate, d3 is a diameter of a maximum pressure generating portion of the dynamic pressure generating groove provided in the thrust-side dynamic pressure generating portion and d4 is an inner diameter of the open portion of the rotary sleeve.

2. A motor employing a fluid bearing device as recited in claim 1.

3. A fluid bearing device comprising:

a solid stationary shaft having a screw-bore for screwing an extension shaft thereto and at least one fixed end and a rotary sleeve supported rotatably about the stationary shaft, adapted to pump a lubricating fluid between the stationary shaft and the rotary sleeve for non-contact rotation therebetween wherein (1) the stationary shaft has a stationary thrust plate, (2) the rotary sleeve has a recessed portion defined by faces thereof opposed to upper and lower faces and an outer circumferential surface of the stationary thrust plate, (3) a dynamic pressure generating groove is in a radial-side dynamic pressure generating portion defined by an outer circumferential portion of the stationary shaft and an inner circumferential portion of a center hole formed in the rotary sleeve, (4) dynamic pressure generating grooves are in a thrust-side dynamic pressure generating portion defined by the stationary thrust plate and an end surface of the recessed portion of the rotary sleeve and the faces of the rotary sleeve opposed to the stationary thrust plate, (5) the radial-side dynamic pressure generating portion and the thrust-side dynamic pressure generating portion are filled with the lubricating fluid, a maximum pressure generating portion of the dynamic pressure generating groove in the thrust-side dynamic pressure generating portion is closer to the outer circumference of the stationary thrust plate than a radially middle position of the thrust-side dynamic pressure generating portion, the thrust portion and radial portion being independent from each other, and (6) $d2^2-d3^2$ is approximately equal to $d3^2-d1^2$ wherein d1 is an inner diameter of a rotary-thrust-side portion of the thrust-side dynamic pressure generating portion, d2 is an outer diameter of the stationary thrust plate, and d3 is a diameter of the maximum pressure generating portion of the dynamic pressure generating groove provided in the thrust-side dynamic pressure generating portion.

* * * * *